United States Patent [19]
DePriest

[11] Patent Number: 5,897,914
[45] Date of Patent: Apr. 27, 1999

[54] RETROREFLECTIVE MARKING AND PROCESS OF APPLYING THE SAME

[76] Inventor: Dennis K. DePriest, 4948 N. Pine Hill Dr., Ozark, Mo. 65721

[21] Appl. No.: 08/856,101

[22] Filed: May 14, 1997

[51] Int. Cl.⁶ .................. B05D 1/26; B05D 1/34; B05D 5/06
[52] U.S. Cl. .............. 427/137; 427/180; 427/199; 427/204; 427/286
[58] Field of Search .................. 427/137, 199, 427/203, 204, 286, 180; 404/14, 101, 114; 239/462, DIG. 23; 209/352, 420, 421; 118/308, 610

[56] References Cited

U.S. PATENT DOCUMENTS

| | | |
|---|---|---|
| 1,424,451 | 8/1922 | Crandall . |
| 2,897,733 | 8/1959 | Shuger .................. 350/105 |
| 3,171,827 | 3/1965 | DeVries et al. . |
| 3,835,087 | 9/1974 | Searight et al. .......... 260/33.6 R |
| 4,721,389 | 1/1988 | Dejaiffe .................. 356/445 |
| 4,856,931 | 8/1989 | Bollag .................. 404/75 |
| 5,039,557 | 8/1991 | White .................. 427/137 |
| 5,380,549 | 1/1995 | Harvison .................. 427/137 |
| 5,417,515 | 5/1995 | Hachey et al. .................. 404/15 |
| 5,571,362 | 11/1996 | Hachey et al. .................. 156/264 |

*Primary Examiner*—Shrive Beck
*Assistant Examiner*—Fred J. Parker
*Attorney, Agent, or Firm*—Richard L. Marsh

[57] ABSTRACT

A paint stripe and a process of applying the paint stripe upon a substantially horizontal surface is provided. Reflective particles are applied in at least two streams upon the substantially fluidic upper surface of the paint stripe. The first stream of particles of greatest size is applied to the paint stripe before subsequent streams, each particle of each of the streams becoming embedded into the fluidic upper surface approximately fifty percent of the maximum dimension of the particles. Capillation of the paint carries the reflective particles of the subsequent streams in an upward manner along the outer surface of the reflective particles of the first stream. The reflective particles of the subsequent streams are then embedded in the fluidic upper surface of the paint stripe at an angle approaching the perpendicular to the horizontal surface.

20 Claims, 3 Drawing Sheets

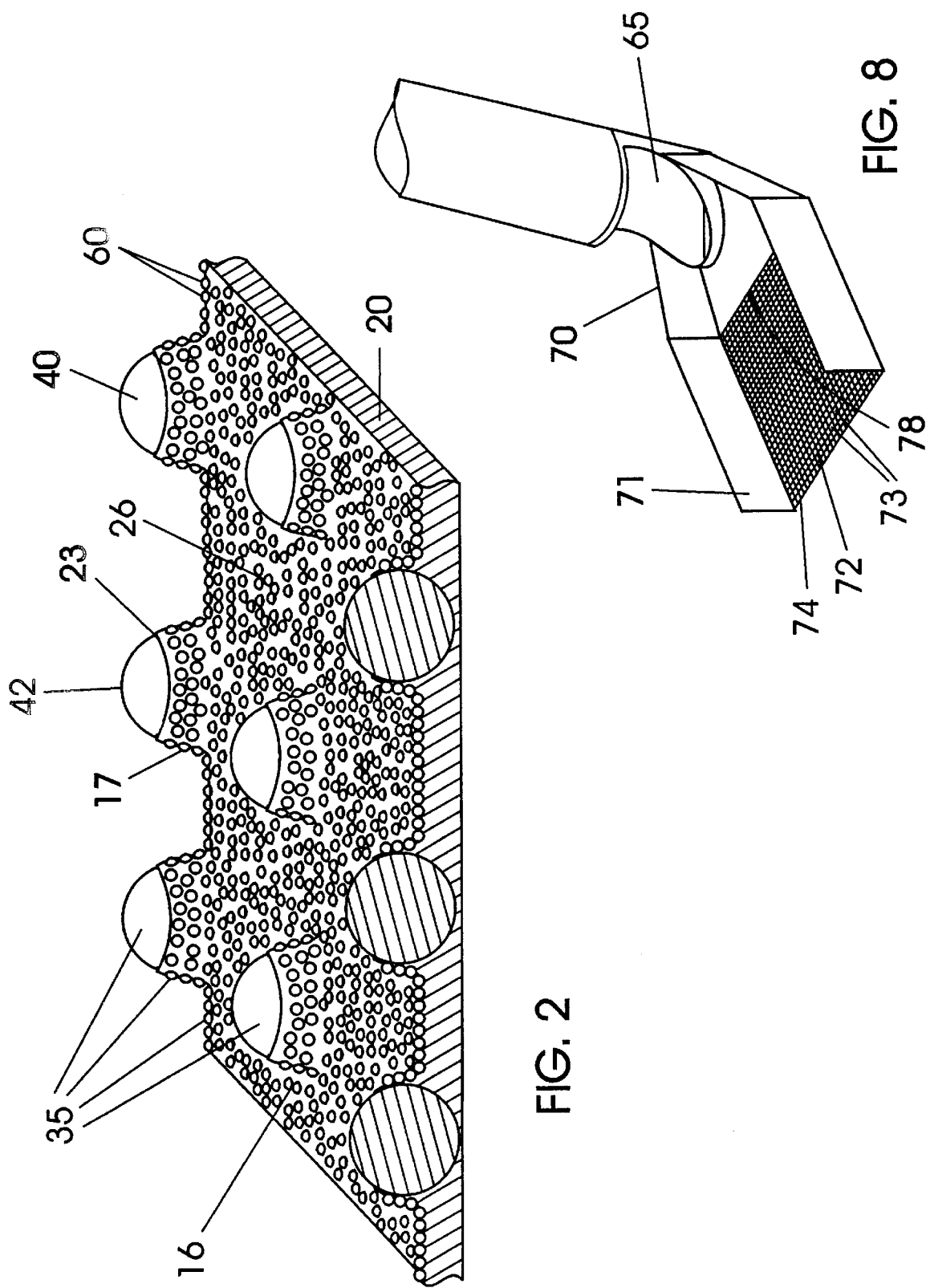

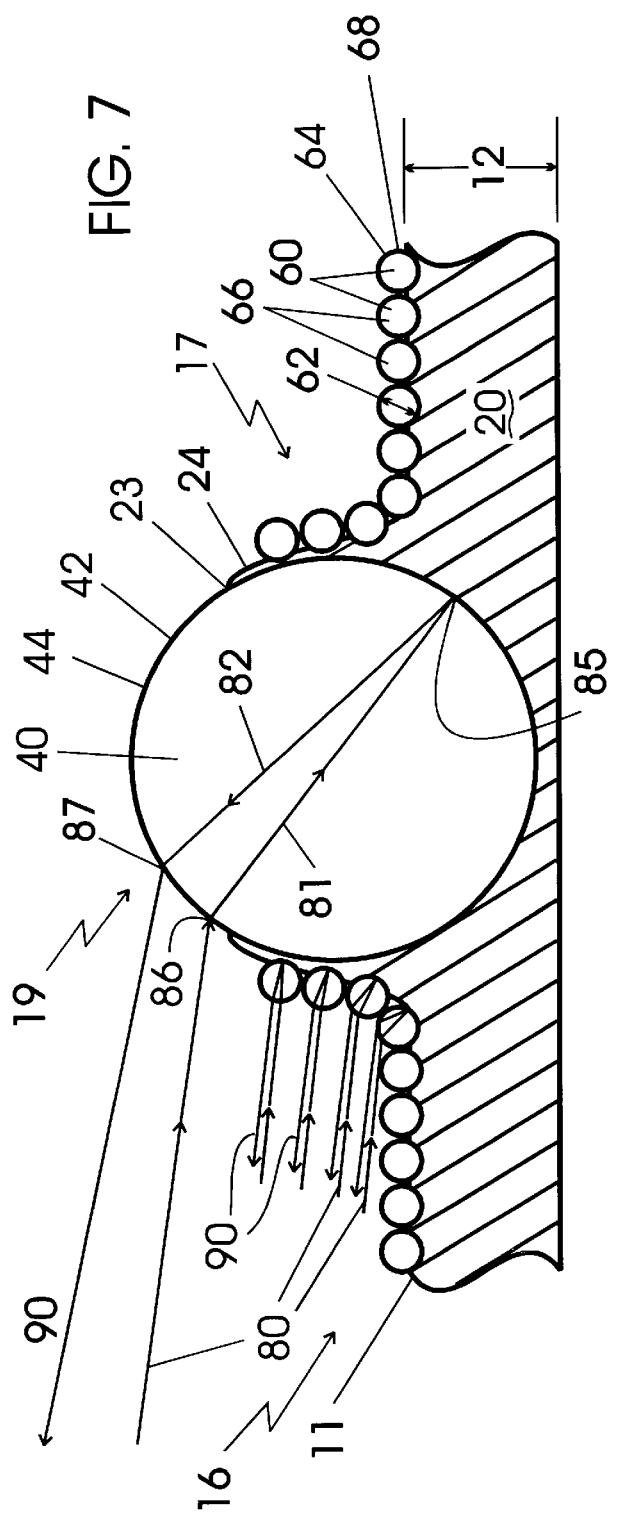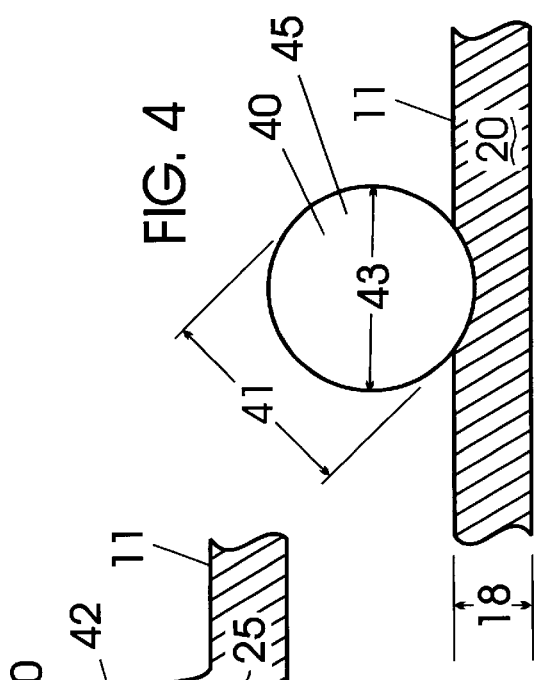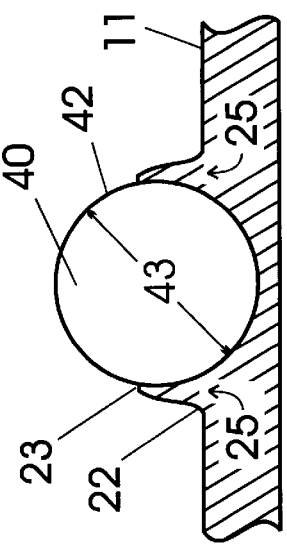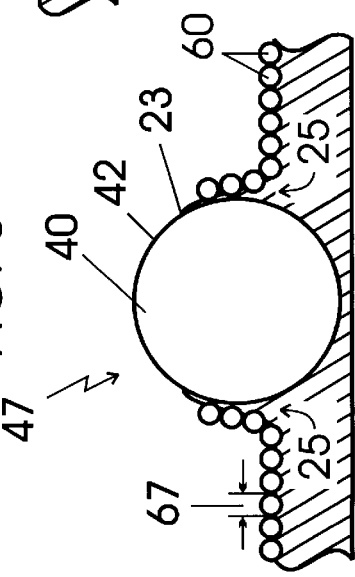

RETROREFLECTIVE MARKING AND PROCESS OF APPLYING THE SAME

BACKGROUND OF THE INVENTION

1. Field of the Invention

This invention relates to a retroreflective paint stripe and a process of applying the paint stripe upon a substantially horizontal surface wherein the paint stripe has reflective particles applied to an upper surface thereof.

2. Prior Art Statement

It is known to make a coating composition which, upon application to a surface, provides reflex-reflective properties to the surface wherein the coating consists of mica flake particles coated with titanium dioxide, glass beads and a binding vehicle. For instance, see the U.S. Pat. No. 3,835,087 to Searight, et al., issued on Sep. 10, 1974.

It is also known to provide a highway and surface marker consisting of a light reflecting pigment coating having essentially the same wet and dry film thickness containing glass spheres embedded therein. For instance, see the U.S. Pat. 2,897,733 issued to Leroy W. Shuger on Aug. 4, 1959.

It is known to measure the retroreflectivity of a reflective layer on a surface by illuminating a portion of the surface at a low angle of incidence with a laser of a specific wavelength, filtering the reflected light at a low angle of observation, collecting the filtered light with a photometer and producing an electrical signal corresponding to the amount of light reflected from the layer. For instance, see the U.S. Pat. No. 4,721,389 issued on Jan. 26, 1988 to Robert Dejaiffe.

It is also known that reflective particles, such as reflective glass beads, on a horizontal surface retroreflect a low percentage of light in the direction of the source of the light at low incident angles and a high percentage of light at angles approaching a perpendicular to the source of light. For instance, see the U.S. Pat. No. 5,571,362 issued on Nov. 5, 1996, to Hachey, et al.

It is known to make small reflective granules by mixing 1–10 parts of glass spheres with one part of a binder composition, solidifying the mixture and then crushing the solidified mixture along lines of cleavage between the binder and the glass spheres to produce the granules. For instance, see the U.S. Pat. No. 3,171,827 to deVries, et al., issued on Mar. 2, 1965.

It is known to make a retroreflective article having a specularly reflective fluid layer, a diffusely reflective layer thereon and then depositing microspheres onto the fluid bi-layer which sink through the diffusely reflective layer and become partially embedded in the specularly reflective layer where in its intended position for use, the article is oriented at least partially vertically. For instance, see the U.S. Pat. No. 5,417,515 issued on May 23, 1995, to Hachey, et al.

The method of providing a traffic surface with both anti-slip and retroreflective characteristics is also known wherein the retroreflective beads are applied to a second coat of paint and are smaller than the anti-slip particles thereby being overshadowed by the anti-slip particles. For instance, see the U.S. Pat. No. 5,380,549 issued on Jan. 10, 1995 to Eric J. Harvison.

Finally, it is known to provide a process of applying a paint stripe having profiling particles embedded in and completely enveloped by the paint and having reflective glass beads scattered upon the upper surface thereof. For instance, see the U.S. Pat. No. 4,856,931 issued on Aug. 15, 1989 to Moses Bollag.

SUMMARY OF THE INVENTION

Since it is expected that the minimum retroreflectivity of highway marking paint will soon be mandated to be at least 150 mcd/m$^2$/lx, (150 millicandela per square meter per lux of illumination) a significant increase in the functionality of highway marking paint is desired. Therefore, it is an object of this invention to provide a reflective paint and a process of applying a reflective paint stripe of indeterminant length upon a substantially horizontal surface comprising the steps of substantially continuously applying a fluidic paint stripe having a width and a dry film thickness substantially equal to the applied wet film thickness upon the substantially horizontal surface, thereafter applying a first stream of particles of greatest size upon a substantially fluidic upper surface of the fluidic paint stripe across the width, thereafter applying at least one subsequent stream of particles of smaller size across the width and upon the substantially fluidic upper surface of the paint stripe, flowing the fluidic upper surface of the paint by capillation upwardly along the outer surface of the particles of greatest size of the first stream, a portion of the fluidic upper surface approaching the perpendicular to the horizontal surface, embedding each particle of each of the streams into the fluidic upper surface and solidifying the fluidic paint stripe.

It is another object of this invention to provide a retroreflective marking paint and a process of applying the paint which has a dry film thickness from 0.1 to 0.7 times the largest dimension of the largest particles applied to the paint.

It is another object of this invention to provide a retroreflective marking paint and a process of applying the paint having at least two streams of particles applied to the upper surface thereof wherein a first stream of particles of greatest size comprises spherical glass beads having a diameter from about 0.2 mm to about 2.0 mm.

It is another object of this invention to provide a retroreflective marking paint and a process of applying the paint having at least two streams of particles applied to the upper surface thereof wherein subsequent streams of particles of smaller size comprises spherical glass beads having a diameter from about 0.05 mm to about 0.5 mm.

It is another object of this invention to provide a retroreflective marking paint and a process of applying the paint having at least two streams of particles applied to the upper surface thereof wherein the volume of each of the particles of the first stream is 10–1000 times the volume of each the particles of smaller size of the subsequent streams.

It is another object of this invention to provide a retroreflective marking paint and a process of applying the paint having at least two streams of particles applied to the upper surface thereof wherein the first stream of particles of greatest size is applied to the fluidic upper surface substantially immediately after the fluidic paint stripe is applied to the horizontal surface.

It is another object of this invention to provide a retroreflective marking paint and a process of applying the paint having at least two streams of particles applied to the upper surface thereof wherein subsequent streams of particles of smaller size are applied to the fluidic upper surface substantially immediately after a first stream of particles of greatest size is applied to the fluidic paint stripe.

It is another object of this invention to provide a retroreflective marking paint and a process of applying the paint having at least two streams of particles applied to the upper surface thereof wherein the substantially fluidic upper surface remains in the fluidic state until the surface tension of the solidifying paint overcomes the force of capillation.

It is another object of this invention to provide a retroreflective marking paint and a process of applying the paint having at least two streams of particles applied to the upper surface thereof wherein the reflective paint stripe is applied at a speed greater than five (5) feet per second.

It is another object of this invention to provide a retroreflective marking paint and a process of applying the paint having at least two streams of particles applied to the upper surface thereof wherein the first stream of particles of greatest size is applied at a rate of 50 to 500 grams per square meter.

It is another object of this invention to provide a retroreflective marking paint and a process of applying the paint having at least two streams of particles applied to the upper surface thereof wherein subsequent streams of particles of smaller size are applied at a rate of 50 to 500 grams per square meter.

It is another object of this invention to provide a retroreflective marking paint and a process of applying the paint having at least two streams of particles applied to the upper surface thereof wherein capillation of the paint carries some of the particles of smaller size of the subsequent streams upwardly along the outer surface of the particles of the first stream.

It is another object of this invention to provide a retroreflective marking paint and a process of applying the paint having at least two streams of particles applied to the upper surface thereof wherein the dry film thickness of the paint stripe is substantially less than the applied wet film thickness.

Finally, it is object of this invention to provide a retroreflective marking paint and a process of applying the paint having at least two streams of particles applied to the upper surface thereof wherein profile shaping particles having a minimum dimension greater that the dry film thickness of the paint are separated from reflective particles of substantially smaller size admixed in a single storage container and distributed simultaneously therefrom, applying the profile shaping particles and reflective particles in separate streams onto the still fresh painted line, flowing the pigmented marking paint by capillation upwardly along the outer surface of the profile shaping particles, a portion of the pigmented marking paint approaching the perpendicular to the horizontal surface, embedding each particle of each of the streams into the pigmented marking paint and solidifying the pigmented marking paint forming the reflective paint marking stripe.

BRIEF DESCRIPTION OF THE DRAWINGS

FIG. 2 is a partially broken away perspective view taken along line 2—2 of FIG. 1 or 3 showing the particular features of this invention.

FIG. 4 is a section view of a particle of greater size along line A—A of FIG. 1 upon impacting the fluidic surface of the painted line.

FIG. 5 is a section view of a particle of greater size along line B—B of FIG. 1 showing capillation of the fluidic surface of the painted line upwardly along the surface of the particle of greater size.

FIG. 6 is a section view of a particle of greater size along line C—C of FIG. 1 showing smaller reflective particles upon the capillation of the fluidic surface of the painted line wherein capillation continues to carry the smaller reflective particles upwardly along the surface of the particle of greater size where they become embedded in the fluidic upper surface at an angle approaching the perpendicular to the horizontal surface.

FIG. 7 is a section view of the particles embedded in the paint stripe showing an incident light beam and a reflected light beam from the particles.

FIG. 8 is a perspective view of the distributing chute of the preferred embodiment of this invention.

DESCRIPTION OF THE PREFERRED EMBODIMENTS

While the various features of this invention are hereinafter described and illustrated as a paint stripe and a process of applying the paint stripe having reflective particles dispersed thereon upon a substantially horizontal surface, it is to be understood that the various features of this invention can be used singly or in various combinations thereof as a process of applying a reflective paint stripe upon other objects as can hereinafter be appreciated from a reading of the following description.

Figure 1:
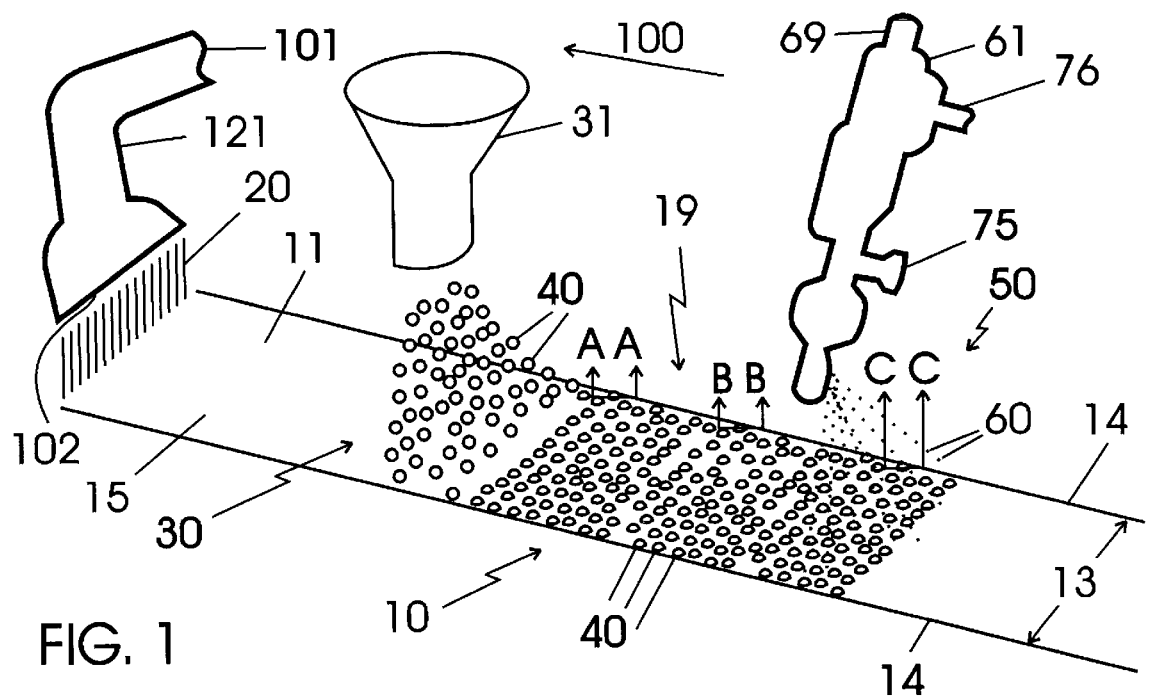
FIG. 1 is a perspective view of one embodiment of the invention showing the streams of particles applied separately to a line painted on a substantially horizontal surface.

Referring now to FIG. 1, a process of applying a reflective paint stripe 10 of indeterminant length upon a substantially horizontal surface is provided. The process comprises the steps of substantially continuously applying a paint 20 from a paint applicator 121, paint 20 being applied as a fluidic paint stripe 15 having a width 13 as measured between edges 14, and a dry film thickness 12, dry film thickness 12 substantially equal to the applied wet film thickness 18 upon the substantially horizontal surface and thereafter applying a first stream 30 of profile shaping particles of greatest size 40 from a particle applicator 31 upon a substantially fluidic upper surface 11 of fluidic paint stripe 15 across width 13. After applying first stream 30, at least one subsequent stream 50 of particles of smaller size 60 is applied from a particle applicator 69 across width 13 upon substantially fluidic upper surface 11 of paint stripe 15. As shown in FIGS. 4–6, fluidic upper surface 11 of paint stripe 15 flows upwardly in the direction of arrow 25 by capillation along the outer surface 42 of particles of greatest size 40 of the first stream 30 and a portion 24 of the fluidic upper surface 11 approaches the perpendicular to the horizontal surface. Each particle 40, 60 of each of the streams 30, 50 is embedded into fluidic upper surface 11 with some of particles 60 being embedded into portion 24. The paint 20 of fluidic paint stripe 15 is solidified to establish reflective paint stripe 10.

In one embodiment of FIG. 1, wherein an extrudable or hot melt paint 20 is applied, paint applicator 121, particle applicator 31 and particle applicator 69 are all mounted on a movable carriage (not shown) mounted on a vehicle (not shown) traveling at greater than 5 feet per second (3 miles per hour) in the direction of arrow 100 along the substantially horizontal surface. In applying a reflective paint stripe 10, an operator moves the carriage in a direction transverse to the direction of travel 100 to align new paint stripe 15 with the existing reflective paint stripe or a premarked pattern when applying new reflective paint stripe 10. The operation of paint applicator 121 and particle applicators 31, 69 are interlocked and therefore operate in concert with each other. The length of the line is determined by the operator by activating and deactivating the interlocked applicators 121, 31, 69 mounted on the carriage.

Figure 3:
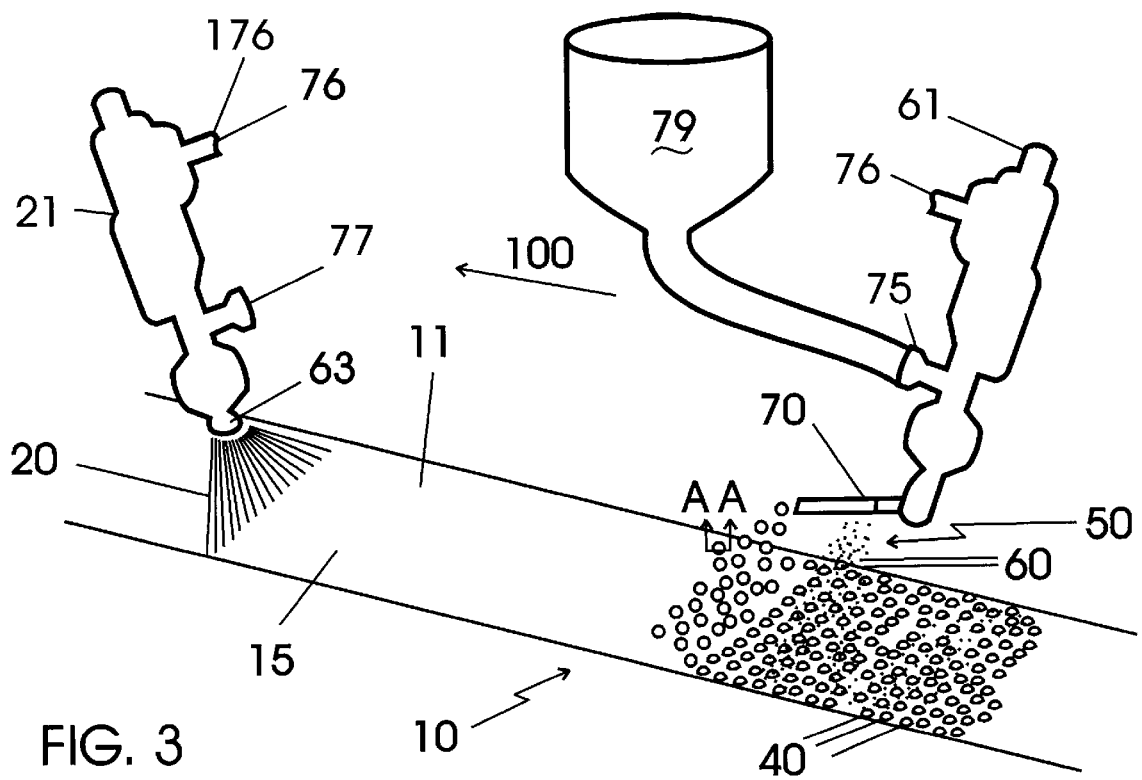
FIG. 3 is a perspective view of the preferred embodiment showing the streams of particles being separated from a single stream and applied in sequential fashion from a distributing chute, smaller particles falling immediately through a screen and larger particles falling from the end of the screen.

In an alternative embodiment of either FIG. 1 or FIG. 3, the process of applying a reflective paint stripe 10 of indeterminant length upon a substantially horizontal surface comprises the steps of substantially continuously applying a fluidic paint stripe 15 of paint 20 from a paint applicator 121 mounted on a movable carriage (not shown) which is affixed to a vehicle (not shown) traveling along the substantially horizontal surface. Paint stripe 10 has a width 13 as measured between edges 14, and a dry film thickness 12 which is substantially less than the applied wet film thickness 18. After applying fluidic paint stripe 15 upon the substantially horizontal surface, a first stream 30 of particles of greatest size 40 is applied from a particle applicator 31 also attached to the movable carriage, upon a substantially fluidic upper surface 11 of fluidic paint stripe 15 across width 13. Thereafter, at least one subsequent stream 50 of particles of smaller size 60 is applied from a particle applicator 69 also attached to the movable carriage, across width 13 and upon substantially fluidic upper surface 11 of paint stripe 15. Fluidic upper surface 11 of paint 15 flows by capillation upwardly in the direction of arrow 25 along the outer surface 42 of particles of greatest size 40 of first stream 30 with a portion 24 of fluidic upper surface 11 approaching the perpendicular to horizontal surface. Each particle 40, 60 of each of streams 30, 50 sinks into fluidic upper surface 11 approximately one half its maximum dimension. When wet film thickness 18 is reduced to dry film thickness 12, the perpendicularity of portion 24 is greatly enhanced and portion 24 thins from a cusp 22 created at the interface of paint stripe 15 and particles of greatest size 40 to terminal end 23. Paint 20 is solidified upon completion of the drying process capturing each particle 40, 60 in paint 20, some of particles 60 being embedded into portion 24.

In this embodiment using a solvent based paint 20, the paint gun 21 as shown in FIG. 3 is used as paint applicator 121 which is mounted along with particle applicator 31 and particle applicator 69 on a movable carriage (not shown) mounted on a vehicle (not shown) traveling at greater than 5 feet per second (3 miles per hour) in the direction of arrow 100 along the substantially horizontal surface. In renewing the retroreflective qualities of a reflective paint stripe 10 in a maintenance application, an operator moves the carriage in a direction transverse to the direction of travel 100 to align new paint stripe 15 with the existing reflective paint stripe when applying new reflective paint stripe 10. The operation of paint applicator 121 and particle applicators 31, 69 are interlocked and therefore operate in concert with each other. The length of the line is determined by the operator by activating and deactivating the interlocked applicators 121, 31,69 mounted on the carriage.

Referring to FIG. 2 through FIG. 7, in the preferred embodiment a process for applying a reflective paint marking stripe 10 of indeterminant length upon a substantially horizontal surface comprises the steps of continuously applying a pigmented marking paint 20 from a paint gun 21 carried by a carriage mounted on a vehicle traveling along the horizontal surface. Paint 20 is applied as a fluidic paint stripe 15 having a width 31 and a dry film thickness 12 substantially equal to the applied wet film thickness 18. Typically profile shaping particles of greatest size 40 have a minimum dimension greater that the dry film thickness 12 of paint 20. Particles 40 are separated from reflective particles of substantially smaller size 60, the particles 40, 60 admixed in a single storage container 79 carried by the vehicle. Particles 40, 60 are introduced simultaneously from the storage container 79 by a particle applicator 69, such as a Binks Model 30 automatic glass bead dispensing gun 61, carried by the carriage onto a distributing chute 70 having an open end 78 directed in the direction of travel 100 of the vehicle. Particles 40, 60 are supplied to particle applicator 69 through particle supply port 75 and forced onto chute 78 by fluid pressure supplied through air supply port 76. Chute 70 has a mesh screen 72 attached to end 78 thereof and has movable edge plates 71 for accommodating different widths of paint stripe 15. Chute 70 extends from the opening 65 of particle applicator 69 to the terminal end 74 of screen 72. Movable edge plates 71 and chute 70 are solid while screen 72 has quadrilateral openings 73 arranged in rows and columns which are of sufficient size to prevent profile shaping particles 40 from passing through screen 72. As chute 70 and screen 72 are pointed upstream in the direction of travel 100 of the vehicle, admixed particles 40, 60 introduced from the storage unit 79 onto mesh screen 72 are separated by screen 72 into two streams. As openings 73 will prevent particles 40 from passing therethrough but will allow passing of particles 60, particles 60 drop immediately through screen 72 while profile shaping particles 40 drop off the end 74 of screen 72 upstream from reflective particles 60. For instance, screen 72 has at least sixteen (16) openings 73 per lineal inch in each direction thereby retaining particles 40 greater than 1000 microns (1 mm), 0.0394 inches, thereon while passing particles of smaller size 60 therethrough. Therefore, since chute 70 is directed upstream in the direction of travel 100, profile shaping particles 40 and reflective particles 60 are thus applied in separate streams 30, 50 onto the still fresh painted line 15 with particles 40 being applied to line 15 upstream of reflective particles 60.

Pigmented marking paint 20 then flows by capillation upwardly in the direction of arrow 25 along the outer surface 42 of profile shaping particles due to surface tension effects, paint 20 has an ability to at least partially ride up on outer surface 42. 40, a portion 24 of pigmented marking paint 20 approaching a perpendicular to the horizontal surface tangential to outer surface 42. Since substantially fluidic upper surface 11 remains in a fluidic state until the surface tension of the drying paint 20 exceeds the capillation force, the capillation of paint 20 carries some of particles 60 upwardly along outer surface 42. Each particle 40, 60 of each of streams 30, 50 sinks into pigmented marking paint 11 becoming embedded and captured therein when pigmented marking paint 20 solidifies with some of particles 60 lying in a substantially vertical plane in portion 24.

In the preferred embodiment shown in FIG. 3, paint gun 21, the storage container 79, and bead gun 61 are all mounted on a movable carriage (not shown) mounted on a vehicle (not shown) traveling at greater than five (5) feet per second (3 miles per hour) in the direction of arrow 100 along the substantially horizontal surface. In renewing the retroreflective qualities of a reflective paint stripe 10 in a maintenance application, an operator moves the carriage in a direction transverse to the direction of travel 100 to align new paint stripe 15 with the existing reflective paint stripe when applying new reflective paint stripe 10. The operation of paint gun 21 and bead gun 61 are interlocked and therefore operate in concert with each other. The length of the line is determined by the operator by activating and deactivating the interlocked paint gun 21, and bead applicator 61 mounted on the carriage. The preferred embodiment may also utilize the extrudable or hot melt paint applicator 121 of FIG. 1 as paint gun 21 and the single particle applicator 69 with chute 70 with mesh screen 72 attached thereto.

Referring now to FIG. 4 through FIG. 7, the dry film thickness 12 of paint stripe 10 is from 0.1 to 0.7 times the largest dimension 41 of particles 40 of first stream 30. Preferably, dry film thickness 12 is from 0.4 to 0.6 times largest dimension 41. Particles of greatest size 40 of first stream 30 may be of any shape and may be selected from the group comprising pebbles, sand, globules of paint or particles of aluminum oxide, zirconium, rubber, cork, thermoplastic or glass. Particles 40 generally comprise spherical glass beads 45 having a diameter 43 and may further have a coating 44 upon the outer surface 42 thereof. It has been found that spherical glass beads 45 having 96% rounds are particularly suited for particles 40. The percentage rounds refers to the percentage of spherical glass beads which are substantially perfectly spherical. It is readily apparent that the conspicuity is enhanced by utilizing substantially spherical glass beads 45 which will accurately refract an incident light beam 80 along refracted ray 81 to a focal point 85 opposite entrance point 86, accurately beam the reflected ray 82 to exit point 87 and accurately refract reflected ray 82 along retroreflective ray 90. Pigmented paint 20 is adhered to surface 42 of particles 40 and contiguous therewith and with point 85 whereby the pigment of paint 20 reflects refracted ray 81 along reflected ray 82. The homogeneity of pigmented paint 20 coupled with the high percentage of rounds utilized in this invention greatly improves the efficiency of each of the reflective particles 45 and hence the retroreflectivity of marking stripe 10. Coating 44 is generally a silane coupling agent which bonds readily to outer surface 42 of particles 40 and reduces the surface tension of liquids which come in contact therewith. Hence, coating 44 is applied to particles 40 in order to increase the capillation of paint 20 as will be hereinafter described. However, it is to be understood that the efficiency of marking stripe 10 may be correspondingly improved utilizing spherical glass beads having a higher or lower percentage of rounds.

Particles of smaller size 60 of subsequent streams 50 may also be of any shape having a maximum dimension 67 and may be selected from the group comprising specularly reflective flakes of metal, thermoplastic or glass or particles of aluminum oxide, zirconium, thermoplastic or glass. In the preferred embodiment, particles 60 generally comprise spherical glass beads 66 having a diameter 62. Spherical glass beads 66 may also have a coating 64 applied to the outer surface 68 thereof. When desired, coating 64 is selected from a silane coupling agent or one of many flotation coatings known in the art which bond readily to outer surface 68. Coating 64 is carefully selected to modify the surface tension of liquids which come in contact therewith thereby determining the embedment of particle 60 in fluidic surface 11 of paint 20. Where flakes of of metal, thermoplastic or glass are used for particles 60, these flakes lie upon the surface 11 of paint 20 and are adhered thereto.

The volume of each of particles 40 of first stream 30 is from ten (10) to one thousand (1000) times the volume of each of particles of smaller size 60 of subsequent streams 50. Where spherical glass beads 66 are used in at least one of subsequent stream 50 and spherical glass beads 45 are used in first stream 30, diameter 62 of spherical glass beads 66 is from approximately one half to one tenth the diameter 43 of spherical glass beads 45 as the volume of spherical glass beads 45, 66 varies with the cube of the diameter. Diameter 43 of spherical glass beads 45 is from about 0.2 mm to about 2.0 mm and is typically approximately 1.0 mm (~0.039 inches) which will pass a number 18 U.S. Standard sieve screen having approximately 18 openings per lineal inch in each direction. First stream 30 of particles of greatest size 40 is applied at a rate of 50 to 500 grams per square meter to fluidic upper surface 11 substantially immediately after fluidic paint stripe 15 is applied to the horizontal surface. In the preferred embodiment, particles of greatest size 40 are applied to fluidic paint stripe 15 at a rate between 300 and 500 grams per square meter and more specifically approximately 400 grams per square meter. Therefore, on a four inch wide reflective paint stripe 10, approximately 12.5 grams of particles of greatest size 40 are applied per lineal foot.

Diameter 62 of spherical glass beads 66 is from about 0.05 mm to about 0.5 mm and is preferably approximately 0.18 mm (0.007 inches) which will pass a number 80 U.S. Standard sieve screen having approximately 80 openings per lineal inch in each direction. Each of subsequent streams 50 of particles of smaller size 60 is applied at a rate of 50 to 500 grams per square meter and at least one of subsequent streams 50 of is applied to fluidic upper surface 11 substantially immediately after first stream 30 of particles of greatest size 40 is applied to paint stripe 15. In the preferred embodiment, particles of smaller size 60 are applied to fluidic paint stripe 15 at a rate between 300 and 500 grams per square meter and more specifically approximately 400 grams per square meter. Hence, on a four inch wide reflective paint stripe 10, approximately 12.5 grams of particles of smaller size 60 are also applied per lineal foot. Reflective paint stripes 10 of different width utilize corresponding amounts of particles of greatest size 40 and of smaller size 60, however it should be appreciated that different amounts of these particles 40, 60 may be utilized and still fall within the scope of the appended claims.

Reflective paint stripe 10 is preferably applied at a standard maintenance speed greater than five (5) feet per second from a vehicle carrying a carriage (not shown) having suitable paint application and particle distributing equipment mounted thereon. Paint 20 is selected from the group comprising multiple component epoxy, hot melt adhesive, petroleum solvent based and thermoplastic or thermoset polymers. Such paints 20 are all well known in the art and are all suitable for use as paint stripe 15 before the application of particles of greatest size 40 thereonto. Paint 20 contains a pigment selected from the group including titanium dioxide, lead chromate or barium sulfate. In one embodiment, a hot melt adhesive or thermoplastic or thermoset paint 20 is prepared which maintains substantially fluidic upper surface 11 in the fluidic state for several minutes at an ambient temperature of 70° Fahrenheit, 30% relative humidity and is applied by extruding from a paint applicator 121 as shown in FIG. 1 having an extrusion barrel 101 on one thereof and an extrusion nozzle 102 on the other end thereof, extrusion nozzle 102 having a width substantially equal to the width 13 of paint stripe 15. In another embodiment, a solvent based paint 20 is prepared which maintains substantially fluidic upper surface 11 in the fluidic state until evaporation of most of the solvent. A solvent based paint 20 is usually applied under pressure from a paint gun 21 of FIG. 3 having an air supply 76 and a paint supply tube 77 attached thereto. In yet another embodiment, a multiple component paint 20 is prepared which maintains substantially fluidic upper surface 11 in the fluidic state for a short period of time, usually one minute or less at 70° Fahrenheit, 30% relative humidity, and is applied under pressure from paint gun 21 of FIG. 3 having an air supply 76 and a paint supply tube 77 attached thereto. The multiple component paint 20 may be admixed just prior to entrance to paint gun 21 at paint supply tube 77 or within paint gun 21. Multiple component paints may also be applied as separate components becoming mixed together at the paint applicator nozzle 63, in the paint stream 20 or at the surface to be painted. A multiple component paint 20 may also be applied utilizing an airless sprayer for paint gun 21 wherein one part is supplied under pressure through supply 176 and the other part supplied under pressure through supply 77.

The fluid state of fluidic upper surface 11 may, of course, be maintained for a greater or lesser amount of time by adjusting any of the parameters, ie viscosity, application temperature, base temperature or concentration of either part. Similarly, the fluid state of fluidic upper surface 11 may be adjusted to accommodate a changed atmospheric temperature or horizontal surface substrate temperature.

Coating 44 on outer surface 42 of particles of greatest size 40 causes paint 20 to ride up outer surface 42 by a capillation, a capillary action enhanced by the silane coupling agent of coating 44. Capillation of paint 20 occurs simultaneously with the sink, or embedment, of particles 40 and is enhanced thereby. Paint 20 rides up outer surface 42 as indicated by upwardly turned arrow 25 and as the surface tension of the upper surface 11 of paint 20 increases with advancing time, a cusp 22 forms between upper surface 11 of paint 20 and a portion 24 of upper surface 11 riding up outer surface 42. Also, as the surface tension of upper surface 11 increases with advancing time, portion 24 thins along outer surface 42 terminating at end 23 between 50 and 80 percent of maximum dimension 41 of particle 40. Capillation of paint 20 may be adjusted by the type and amount of silane coupling agent of coating 44 and/or by adjusting the parameters of paint 20. As capillation of paint 20 begins to occur immediately upon contact of particles of greatest size 40 with upper surface 11 and continues until the surface tension of upper surface 11 equals the force of capillation, particles of smaller size 60 of subsequent streams 50 which contact upper surface 11 during this period of capillation are carried upwardly in the direction of upwardly turned arrow 25 along portion 24. Particles 60 are therefore resident on cusp 22, portion 24 and the remaining exposed horizontal surface 26 of upper surface 11 after profile shaping particles 40 are embedded into upper surface 11.

It is readily apparent to one skilled in the art that when particles of smaller size 60 are coated with a silane coupling agent, then capillation of paint 20 also occurs on an outer surface 68. When a flotation coupler is used as coating 64, some capillation of paint 20 upon outer surface 68 of particles of smaller size 60 may also occur. The wetting out of particles 40, 60 is the function of the silane agent or flotation coupler and determines the depth of embedment into paint 20. Preferably, particles 60 become embedded into upper surface 11 approximately fifty (50) percent of maximum dimension 67. Where spherical glass beads 66 are utilized as particles 60, beads 66 are embedded approximately half their diameter into paint 20 as shown in FIGS. 6 and 7.

Particles of greatest size 40 protrude from paint 20 approximately one-half their maximum dimension 41 thereby protecting particles of smaller size 60 from abrasive action as particles of greatest size 40 are at least twice the maximum dimension of particles of smaller size 60. Where particles of smaller size 60 are embedded in portion 24 upon outer surface 42, the uppermost exposed portion 47 of particles of greatest size 40 protrudes above any portion of any of particles of smaller size 60 thereby protecting these smaller particles 60 from abrasive action.

The resulting reflective paint marking stripe 10 as described herein is a durable marking stripe 10 having profile shaping particles 40 protruding from a solidified paint stripe 15 which further have reflective particles 60 embedded in a horizontal surface 26 of the paint 20 and also embedded in a substantially vertical surface 17 upwardly along outer surface 42 of profile shaping particles 40. Where spherical reflective glass beads are used for profile shaping particles 40 and reflective particles 60, a first retroreflective surface 16, a second retroreflective surface 19 and a third, vertical retroreflective surface are established as will be hereinafter explained. The glass beads 45 are at least twice the size of the glass beads 66 and in the preferred embodiment are approximately five (5) times the size of glass beads 66.

In each of the above embodiments, profile shaping particles 40 are typically low reflective index spherical reflective glass beads 45 which are relatively low in cost to higher reflective index beads therefore making the marking stripe 10 of this invention less costly. Even though low index glass beads are used for profile shaping particles 40, a second retroreflective surface 19 is created by the layer of spherical reflective glass beads 45 which reflects a portion of incident light 80. The reflective index of the preferred spherical reflective glass beads 45 is typically 1.5 however, when higher index glass beads, such as 1.9, 2.35 or 2.65 index are used as profile shaping particles 40, the retroflectivity of second retroreflective surface 19 is increased correspondingly. It has been found that the retroreflectivity of the glass beads 45 of a reflective index of 1.5 of this invention having 96% rounds have greatly enhanced the retroreflectivity of second retroreflective surface 19.

The reflective glass beads 60 embedded in horizontal surface 26 create a first retroreflective surface 16 and are also typically low reflective index beads having a reflective index of approximately 1.5. The use of low index beads for the reflective glass beads 60 of this layer helps in making the marking stripe 10 of this invention less costly and hence less costly to apply. A layer of reflective glass beads 60 without profile shaping particles 40 interspersed thereon is typical of a retroreflective paint stripe well known in the industry. Therefore, the reflective glass beads 60 of first retroreflective surface 16 constitutes a typical reflective paint stripe 10 commonly used in the industry.

As previously mentioned, it is expected that the minimum retroreflectivity of highway marking paint will soon be mandated to be at least 150 mcd/m$^2$/lx, a significant increase in the functionality of highway marking paint. Use of higher index glass beads for reflective glass beads 60 on a horizontal surface 26 will increase the retroreflectivity of the paint by an amount equal to the ratio of the indices.

However, referring to FIG. 2 and FIG. 7 in the instant invention, a vertical third retroreflective surface 17 is created when reflective glass beads 60 are carried upwardly along outer surface 42 of reflective glass beads 40 wherein a portion of reflective glass beads 60 are embedded in a substantially vertical portion 24 of paint 20. First reflective surface 16 reflects an incident light beam 80 along a reflected ray 90 having a first retroreflectivity approximately equal to the retroreflectivity of a prior art retroreflective surface. Second reflective surface also reflects an incident light beam 80 along a reflected ray path 90 having a second retroreflectivity also approximately equal to the retroreflectivity of a prior art retroreflective surface. It is readily observed therefore, that vertical retroreflective surface 17 created by the reflective beads embedded in portion 24 reflects an incident light beam 80 along a reflected ray path 90 with an intensity greater than the reflected intensity of the prior art retroreflective surface. In fact, the retroreflectivity of vertical retroreflective surface 17 is at least doubled as taught in the aforementioned U.S. Pat. No. 5,571,362 as the incident light 80 approaches reflective glass beads 60 of vertical surface 17 at a high angle of incidence. Therefore, it can be readily observed that the retroreflectivity of second surface 19 and first surface 16 is greatly enhanced by the retroreflectivity of vertical surface 17. For example, it has been found that the retroreflectivity of a horizontal marking stripe 10 applied by the teachings of this invention easily exceeds the 150 mcd/m$^2$/lx lower threshold limit of the proposed mandate and that retroreflectivity of at least 300 mcd/m$^2$/lx has been achieved.

While the forms and methods of this invention now preferred have been illustrated and described as required by the Patent Statute, it is to be understood that other forms and methods can be utilized and still fall within the scope of the appended claims.

I claim:

1. A process for applying a reflective paint marking stripe of indeterminant length upon a substantially horizontal surface comprising the steps of continuously applying a pigmented marking paint along said length having a width and a dry film thickness substantially equal to the applied wet film thickness upon said substantially horizontal surface, separating profile shaping particles having a minimum dimension greater that the dry film thickness of said paint from reflective particles of substantially smaller size, said profile shaping particles and said reflective particles admixed in a single storage container and thereafter distributed simultaneously therefrom, applying said profile shaping particles and reflective particles in separate streams onto said pigmented marking paint, flowing said pigmented marking paint by capillation upwardly along the outer surface of said profile shaping particles, a portion of said pigmented marking paint approaching a perpendicular to said horizontal surface tangential to said outer surface, embedding each particle of each of said streams into said pigmented marking paint and solidifying said pigmented marking paint forming said reflective paint marking stripe.

2. A process as in claim 1 wherein the dry film thickness of said paint stripe is from 0.1 to 0.7 times the largest dimension of said particles of said first stream.

3. A process as in claim 1 wherein said pigmented marking pant remains in the fluidic state until the surface tension of the drying paint overcomes the force of capillation.

4. A process as in claim 1 wherein said reflective paint stripe is applied at a speed of 5 to 20 feet per second.

5. A process as in claim 1 wherein said capillation of said pigmented marking paint carries some of said particles of smaller size upwardly along the outer surface of said profile shaping particles.

6. A process as in claim 1 wherein said step of separating said profile shaping particles and said reflective particles comprises the step of introducing said admixed particles from said storage container onto a mesh screen having openings of sufficient size to prevent profile shaping particles from passing through said screen, said reflective particles dropping immediately through said screen whilst said profile shaping particles drop off the terminal end of said screen upstream from said reflective particles.

7. A process as in claim 6 wherein said profile shaping particles dropping off said end of said screen comprise a first stream of particles and said reflective particles dropping immediately through said screen comprise at least one subsequent stream of particles.

8. A process as in claim 7 wherein particles of said first stream comprises spherical glass beads.

9. A process as in claim 8 wherein said spherical glass beads have a diameter from about 0.2 mm to about 2.0 mm.

10. A process as in claim 9 wherein said at least one of said subsequent streams of particles comprises spherical glass beads having a diameter from about one tenth to about one half the diameter of said spherical glass beads of said first stream.

11. A process as in claim 7 wherein said particles of said at least one of said subsequent streams comprises spherical glass beads.

12. A process as in claim 7 wherein said first stream of profile shaping particles is applied to said pigmented marking paint substantially immediately after said pigmented marking paint stripe is applied to said horizontal surface.

13. A process as in claim 7 wherein said first stream of particles of greatest size is applied at a rate of 50 to 500 grams per square meter of said paint stripe.

14. A process as in claim 13 wherein said first stream of particles of greatest size is applied at a rate from about 300 to about 500 grams per square meter of said paint stripe.

15. A process as in claim 7 wherein said at least one subsequent stream of particles of smaller size is applied at a rate of 50 to 500 grams per square meter of said paint stripe.

16. A process as in claim 15 wherein said at least one subsequent stream of particles of smaller size is applied at a rate from about 300 to about 500 grams per square meter of said paint stripe.

17. A process as in claim 7 wherein said at least one subsequent stream of reflective particles creates a second retroreflective surface.

18. A process as in claim 7 wherein said at least one subsequent stream of reflective particles creates a substantially vertical third retroreflective surface upon said portion of said fluidic upper surface approaching the perpendicular to said horizontal surface tangent to said outer surface.

19. A process as in claim 7 wherein said at least one subsequent stream of particles is applied to a fluidic upper surface of said pigmented paint substantially immediately after said first stream of particles is applied to said horizontal surface.

20. A process as in claim 7 wherein said first stream of particles is applied at a rate of substantially 400 grams per square meter of said paint stripe and said at least one subsequent stream of particles is applied at a rate of substantially 400 grams per square meter of said paint stripe.

* * * * *